E. J. SIMON.
GROUND DETECTOR.
APPLICATION FILED JULY 8, 1918.
1,391,911. Patented Sept. 27, 1921.
Fig. 1.
Fig. 2.
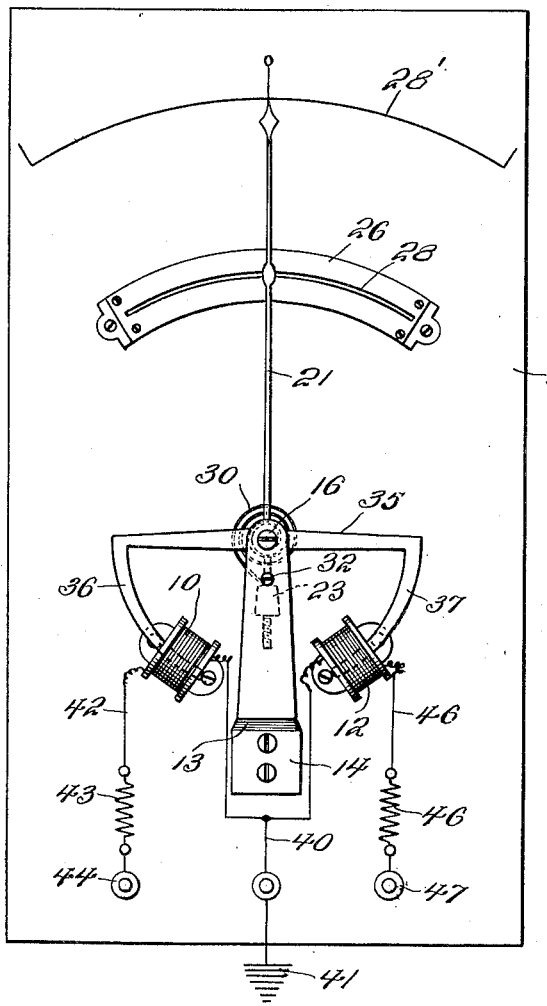
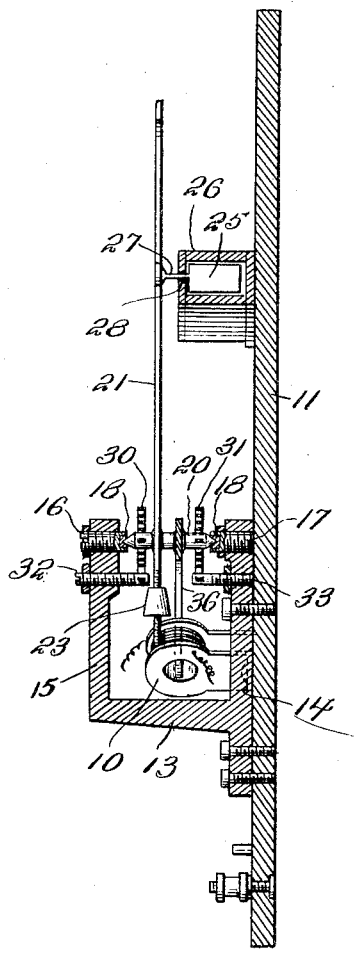
Witnesses
J. F. L. Wright
D. M. Burns
Inventor
Ernest J. Simon
By Victor J. Evans
Attorney

UNITED STATES PATENT OFFICE.

ERNEST J. SIMON, OF GUANTANAMO, CUBA.

GROUND-DETECTOR.

1,391,911.  Specification of Letters Patent.  Patented Sept. 27, 1921.

Application filed July 8, 1918. Serial No. 243,782.

*To all whom it may concern:*

Be it known that I, ERNEST J. SIMON, a citizen of Cuba, residing at Guantanamo, Cuba, have invented new and useful Improvements in Ground-Detectors, of which the following is a specification.

This invention relates to ground detecting devices, and the object is to provide an instrument which shall be simple in construction and not easily thrown out of adjustment, and which shall be more effective in operation than many of the devices heretofore and now employed for the purpose.

A further object is to provide in an instrument of the type indicated a plurality of coils each provided with an armature, said armatures being connected with a transversely extending arm mounted on a pin, and normally retained in position for holding a pointer at zero by means of a plurality of coiled springs, the armature coils having connection with each other, and having line connections and a ground connection.

With the foregoing and other objects in view, the invention consists in the novel construction, combination, and arrangement of elements hereinafter described and claimed.

In the drawings—

Figure 1 is a front view of the instrument, and Fig. 2 is a vertical section thereof.

A plurality of coils designated 10 and 12 are mounted in any suitable manner on a stationary element 11, on which is also mounted a bracket 13 including the base plate 14 and a plate member 15 spaced from member 14, both of the elements last named being provided with threaded bores, in alinement, adapted to receive adjusting screws 16 and 17 mounting jewels 18 constituting bearings for a pivot of hardened steel, designated 20.

This pivot 20 serves to mount the pointer 21, that portion of the pointer extending below the pivot being provided with a counter-weight 23.

The pointer carries a vane 25, operating within a segmentally formed chamber 26, and having connection with the pointer by means of a stem 27 passing through a slot 28 in the casing in which said chamber is formed. The object of this construction is to equalize the movement of the pointer and to prevent undue vibration thereof. The pointer coöperates with a scale 28′.

Two spiral flat springs, preferably of phosphor-bronze, are shown at 30 and 31 and have connection with pivot 20 and with adjusting screws 32 and 33, whereby the effective length of the springs may be slightly varied for the purpose of placing the pointer in zero position when accidentally thrown out of adjustment from any cause.

An arm 35 is carried by the pivot and is normally in a horizontal position, each end of the arm being formed with a curved member 36 or 37, as the case may be, and each constituting an armature for the adjacent coil. The coils 10 and 12 are connected by a wire 40, which in turn is connected to ground at 41. Coil 10 is connected by wire 42 with a resistance 43 and is provided with a terminal 44. Coil 12 is connected by means of a wire 45 with a resistance 46, the latter being connected with terminal 47.

If this instrument is used in connection with a lamp ground detector, the resistance members 43 and 46 are dispensed with, and the instrument is calibrated with the lamps, the latter being of a given value and serving the same purpose as resistance elements 43 and 46. The instrument is not affected by stray currents, and the current is not taken in through the springs, as in certain types of instruments, but directly through the coils of the solenoids. It will be observed that the vane 25, springs 30, 31 and armatures or cores 36, 37 are all concentric or operate in paths concentric with the pivotal mounting of the arm. A jeweled mounting is provided, and in view of the concentric arrangement specified, all movement or resistance to movement will be in or along arcs of concentric circles, so that very accurate adjustment may be made, and extreme sensitiveness will follow as a necessary result of the manner of assembling the elements—each device acting to produce movement or to resist movement coöperating with the other devices in this group.

The leads of a circuit to be tested are connected with the terminals 44 and 47. If there is no ground the coils 10 and 12 will be energized in the same degree and the pointer will not be deflected. If one side of the circuit is grounded, the pointer will be deflected, as the magnetic action of the current will be exerted, or chiefly exerted, on one of the cores 36, 37.

What is claimed is:

In a device of the class described, a pivotally mounted arm, a plurality of coiled springs connected with the pivotal mounting of the arm and assisting in returning the latter to a given position when deflected, a pointer mounted on the pivot, a plurality of coils, an armature member for each coil, said members having connection with the arm at opposite ends thereof, means for connecting the coils with each other said means having connection with the ground, terminal members for connection with the leads of a circuit to be tested, and a resistance located adjacent each terminal member and connected with the latter and with the respective coils, an air resistance vane connected with the arm and moving in a path concentric with the pivotal mounting of the arm, the aforesaid coiled springs and armature members also being approximately concentric with the pivotal mounting of the arm.

In testimony whereof I affix my signature.

ERNEST J. SIMON.